(12) United States Patent
Moss et al.

(10) Patent No.: US 10,940,893 B2
(45) Date of Patent: Mar. 9, 2021

(54) REINFORCED OPEN-SECTION STRUCTURAL PANEL

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Peter M. Parlow, Columbus, MI (US); Keith J. Saari, Macomb Township, MI (US); Eduardo B. Bugelli, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 16/514,175

(22) Filed: Jul. 17, 2019

(65) Prior Publication Data

US 2021/0016838 A1 Jan. 21, 2021

(51) Int. Cl.
*B60J 7/00* (2006.01)
*B62D 23/00* (2006.01)
*B62D 27/02* (2006.01)
*B62D 29/00* (2006.01)

(52) U.S. Cl.
CPC ........... *B62D 23/00* (2013.01); *B62D 27/026* (2013.01); *B62D 29/008* (2013.01)

(58) Field of Classification Search
CPC .. B60P 3/20; B60P 7/14; B64D 11/003; F25D 17/005; F25D 2317/063; B01D 29/05; F16C 1/262; B65D 2590/046; B65D 90/047; Y02T 50/60
See application file for complete search history.

(56) References Cited

U.S. PATENT DOCUMENTS

| | | | | |
|---|---|---|---|---|
| 3,866,544 | A * | 2/1975 | Rothell | B60P 7/14 410/129 |
| 9,969,442 | B1 * | 5/2018 | Vigil | B62D 29/002 |
| 10,272,953 | B2 * | 4/2019 | Delord | B62D 25/14 |
| 2003/0137162 | A1 * | 7/2003 | Kropfeld | B62D 29/002 296/203.01 |
| 2009/0108626 | A1 * | 4/2009 | Richardson | B62D 65/02 296/187.02 |
| 2009/0195027 | A1 * | 8/2009 | Heck | B62D 25/081 296/192 |
| 2016/0129948 | A1 * | 5/2016 | Schnaufer | B62D 29/043 296/203.01 |

(Continued)

*Primary Examiner* — Kiran B Patel
(74) *Attorney, Agent, or Firm* — Quinn IP Law

(57) ABSTRACT

A bulkhead for a vehicle body structure includes a panel. The panel has a contour defined by a contour length and characterized by an open section having three surfaces in a cross-sectional view. The bulkhead also includes a support member embedded in the panel. The support member includes an external form configured to interface with and match at least two of the three surfaces of the contour. The support member also includes a support member length configured to fit within the contour length and a boxed cross-section having a substantially uniform shape along the support member length. The bulkhead additionally includes an adhesive applied between the external form of the support member and the interfacing surfaces of the contour to thereby bond the support member to the panel and reinforce the bulkhead. A vehicle having a structure with such a bulkhead is also considered.

20 Claims, 3 Drawing Sheets

(56) References Cited

U.S. PATENT DOCUMENTS

2016/0159407 A1* 6/2016 Holmstrom .......... B62D 25/082
                                                    296/187.1
2016/0368535 A1* 12/2016 Kim ..................... B62D 29/008
2019/0031244 A1* 1/2019 Riffe .................... B62D 21/152

* cited by examiner

REINFORCED OPEN-SECTION STRUCTURAL PANEL

INTRODUCTION

The present disclosure relates to a reinforced open-section panel for a frame and body structure of a motor vehicle.

Typically, a vehicle includes a body structure for enclosing and supporting various vehicle systems, as well as the vehicle passengers. Heavy-duty vehicles, such as pick-up trucks and vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain. Frequently, additional structural members are used to buttress the vehicle body structure, as well as for supporting various chassis and powertrain subsystems.

Integral frame and body construction requires more than simply attaching an unstressed body to a conventional frame. In a fully integrated body structure, the entire vehicle is a load-carrying unit that handles all the loads experienced by the vehicle, such as forces from driving and cargo. Integral-type bodies for wheeled vehicles are typically manufactured by welding preformed metal panels and other components together, by forming or casting whole sections as one piece, or by a combination of these techniques. Integral frame and body construction is generally lighter and more rigid than a vehicle having a separate body and frame.

In unibody vehicle construction, the frame, the exterior shell, and the chassis are made as a single structure, with box sections, bulkheads, and tubes providing additional rigidity, while the skin adds relatively little strength or stiffness. A true monocoque frame is basically a "skin" that supports various loads by distributing tension and compression across its surface, and lacks a load-carrying internal frame. Although such a structure is sometimes also referred to as monocoque, because the vehicle's outer skin and panels are made load-bearing, there are still ribs, bulkheads and box sections to reinforce the body, making the description semi-monocoque more appropriate.

SUMMARY

A bulkhead for a vehicle body structure includes a panel. The panel has a contour defined by a contour length and characterized by an open section having three surfaces in a cross-sectional view of the panel. The bulkhead also includes a support member embedded in the panel. The support member includes an external form configured to interface with and match at least two of the three surfaces of the contour. The support member also includes a support member length configured to fit within the contour length and a boxed cross-section having a substantially uniform shape along the support member length. The bulkhead additionally includes an adhesive applied between the external form of the support member and the interfacing surfaces of the contour to thereby bond the support member to the panel and reinforce the bulkhead.

The panel may be a high-integrity die-casting, i.e., a casting formed while a vacuum is generated in the die, having consistent material properties.

The material of the panel may be an aluminum alloy.

The yield strength of the panel material may be in a range of 130-160 MPa.

The support member may be an extruded component.

The material of the support member may be an aluminum alloy.

The yield strength of the support member material may be at least 220 MPa.

The bulkhead may additionally include a fastener configured to extend through the external form of the support member and one of the interfacing surfaces of the contour to thereby supplement the adhesive and fix the support member to the panel.

The support member may define a pre-generated aperture configured to accept the fastener. In such an embodiment, the fastener may be a blind rivet.

The support member may be characterized by an absence of a pre-generated aperture configured to accept the fastener. In such an embodiment, the fastener may be a flow drill screw configured to generate a fastener aperture by locally melting material of the support member.

A vehicle having a body structure using a frame rail fixed to such a reinforced bulkhead is also disclosed.

The vehicle body structure may be an integral body and frame structure, such as either a unibody or a semi-monocoque structure.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
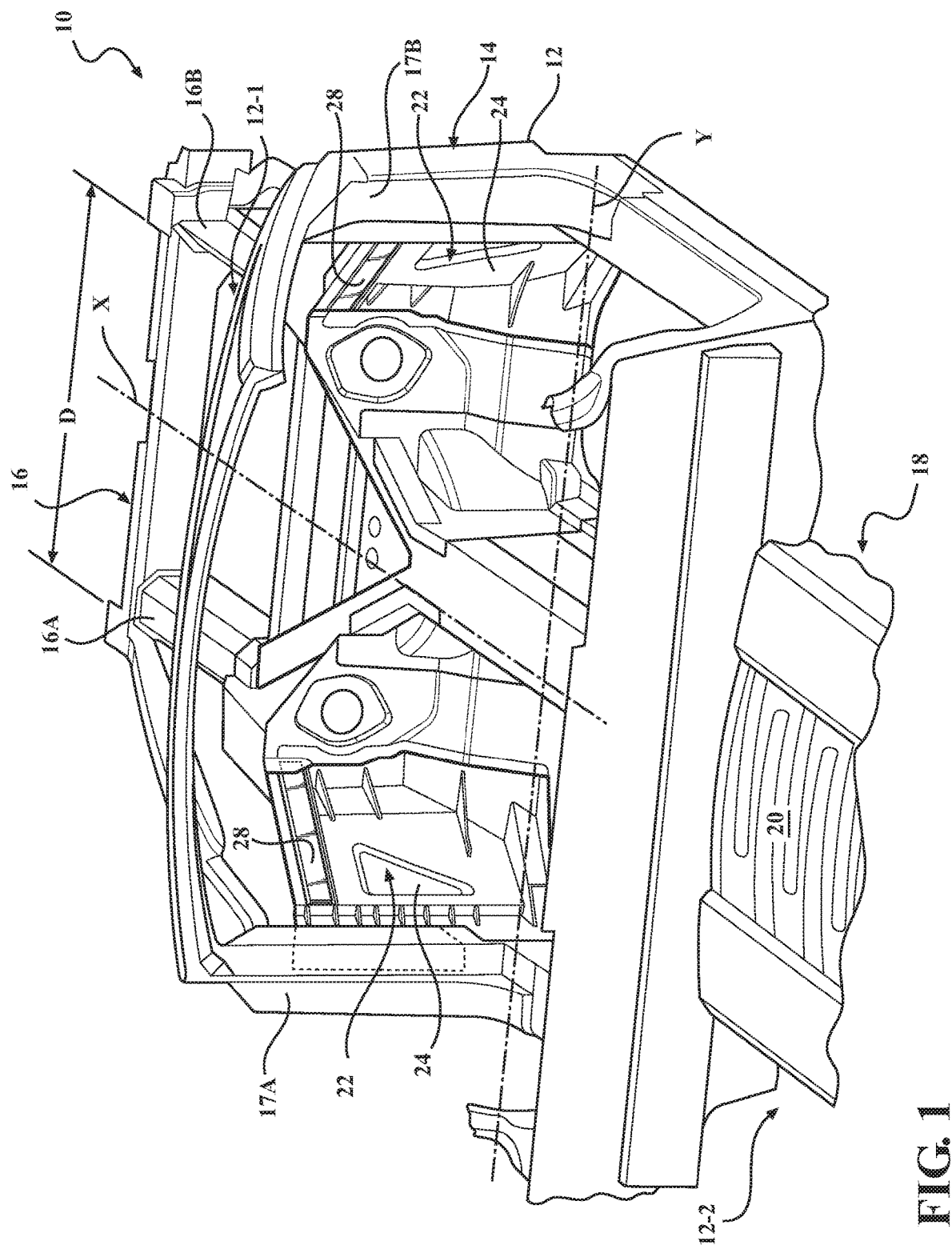
FIG. 1 is a schematic perspective partial view of an integrated vehicle body structure supporting a vehicle powertrain and having symmetrically positioned bulkheads fixed to vehicle frame rails.

Referring to the drawings, wherein like reference numbers refer to like components, FIG. 1 shows a perspective schematic outline of a vehicle 10 having a vehicle body structure 12 having a front section 12-1 and a rear section 12-2. The vehicle body structure 12 is made up of a vehicle body 14 constructed from a number of components, such as exterior body panels (not shown), sub-structures, and a frame 16. The vehicle body 14 is characterized by a longitudinal vehicle centerline that generally coincides with an X-axis and is orthogonal to a Y-axis (shown in FIG. 1). The vehicle body 14 is attached to the frame 16, thus enabling a support structure for a vehicle suspension (not shown) and wheels, while also supporting vehicle subsystems, such as a steering system (not shown), a powertrain 18, passengers, and cargo. As shown, the frame 16 is arranged in the general plane of the vehicle 10, substantially defined by the X and Y axes.

As shown, the frame 16 includes two frame rails, 16A and 16B, separated in the vehicle body structure 12 by a distance D. The frame rails 16A and 16B may be substantially parallel with respect to each other, e.g., within +/−5° of true parallel. As shown, the frame rails 16A, 16B may be configured as partial rails that exclude the dashed line sections, thereby defining an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add a relatively little strength or stiffness. Similar to the unibody structure, a semi-monocoque construction is an integrated structure employs ribs, bulkheads, and box sections to reinforce the vehicle body, while the outer body panels bear a smaller portion of the structural load.

The first and second frame rails 16A, 16B are arranged substantially symmetrically with respect to the X-axis or the longitudinal vehicle centerline. As used herein, the term "substantially symmetrically" may denote a positioning of specified components that is within +/−5 cm of true symmetry with respect to the X-axis. Frame rails 16A and 16B may be constructed from aluminum, and be formed by one or more appropriate methods, such as extrusion, hydroforming, roll-forming, stamping, and welding. The vehicle body structure 12 also includes sub-structures 17A and 17B. Accordingly, the shown first and second frame rails 16A, 16B and sub-structures 17A and 17B may be part of a unibody or semi-monocoque structure in a generally light-duty passenger vehicle. As appreciated by those skilled in the art, the disclosed vehicle body structure 12 may be used in a rear-wheel drive, a front-wheel drive, or a four-wheel drive configuration. As shown, the vehicle 10 includes a powertrain 18 having an internal combustion engine 20. The powertrain 18 may be positioned proximate the front section 12-1 of the vehicle body structure 12, or proximate the rear section 12-2 (as shown in FIG. 1).

Figure 2:
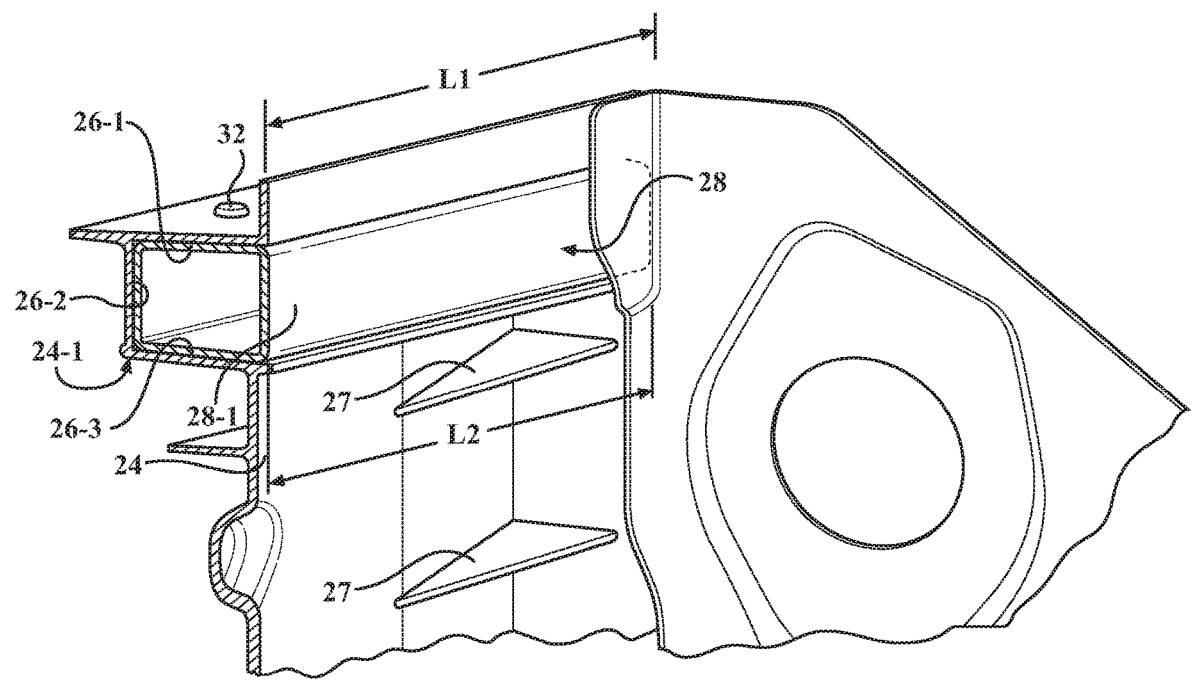
FIG. 2 is a schematic close-up perspective view of one bulkhead shown in FIG. 1, specifically focusing on the bulkhead's panel reinforced with a support member, according to the disclosure.
Figure 3:
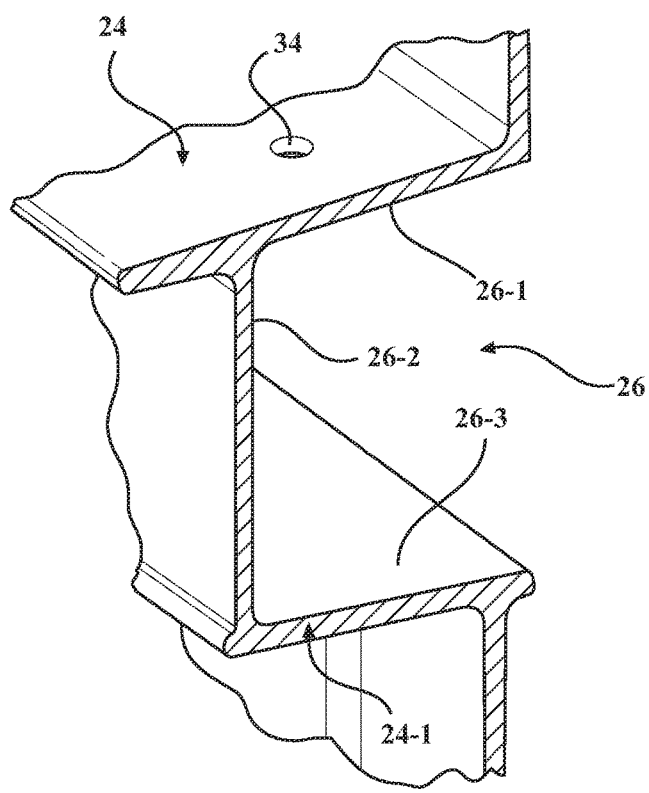
FIG. 3 is a schematic close-up perspective partial cross-sectional view of the panel depicted in FIG. 2, but with the support member removed.

As may be seen in FIGS. 1 and 2, the vehicle body structure 12 includes a reinforced bulkhead 22, which may be made a load-bearing component in either a unibody or a semi-monocoque construction. Furthermore, as shown, the vehicle body structure 12 may include two bulkheads 22, one on each side of and symmetrically positioned relative to the longitudinal centerline of the vehicle body 14. As shown, the two bulkheads 22 are individually fixed to the frame rails 16A and 16B at one end, and to the sub-structures 17A and 17B, respectively, at another end. The bulkheads 22 maybe joined, for example laser welded, to the respective frame rails 16A, 16B and to the sub-structures 17A, 17B. As a result, thus interconnected bulkheads 22, frame rails 16A, 16B, and sub-structures 17A, 17B may facilitate a high strength and stiffness front section 12-1 or rear section 12-2 of the vehicle body structure 12.

Figure 4:
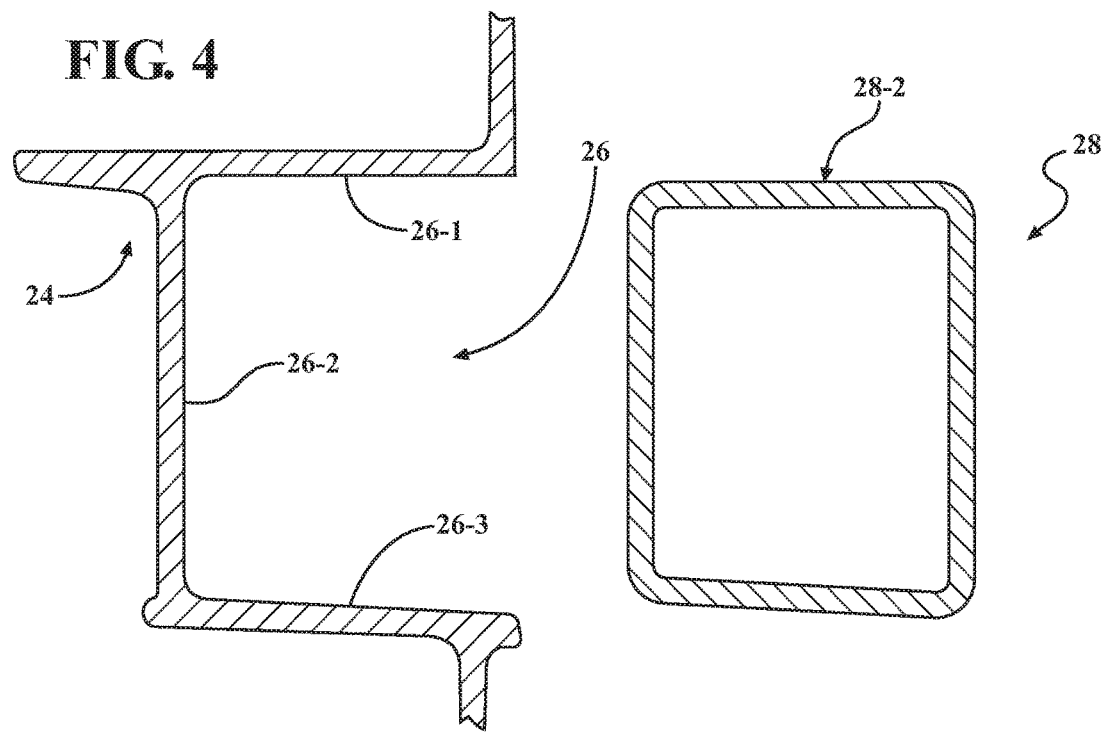
FIG. 4 is a schematic close-up cross-sectional view of the panel and the support member depicted in FIG. 2, according to the disclosure.

Each bulkhead 22 includes a panel 24 having a contour 24-1, wherein the contour includes a specific form and profile, and is defined by a contour length L1. The panel 24 is characterized by an open, i.e., C-shaped, section 26 having three surfaces, 26-1, 26-2, and 26-3, in a cross-sectional view of the panel shown in FIGS. 2 and 4. The panel 24 is configured to interface with and support other panels (not shown) of the vehicle body structure 12 to reinforce and stiffen the vehicle body 14. The panel 24 may define a cast-in rib 27 (shown in FIG. 2) configured to stiffen the panel. The base material of the panel 24 may be aluminum. Generally, aluminum die-castings are susceptible to defects and inconsistencies, such as gas porosity, shrinkage porosity, oxide or other inclusions, and incomplete die fill. Such defects may negatively impact the finished component reliability and strength.

A particular "high-integrity" die-casting process, where vacuum is generated in, i.e., the air is pulled out of, the die cavity with the aid of a controlled vacuum valve (not shown), maybe used to address such potential defects in aluminum die-castings. Specifically, the vacuum generated in the die may be in a range of 20-300 mbar. Some aluminum alloys are particularly well suited to the high-integrity die-casting process, such as aluminum-silicone and aluminum-magnesium-silicone families of alloys, where silicone and magnesium are used to enhance mechanical properties of the casting. The panel 24 may be a high-integrity die-casting from aluminum-silicone or aluminum-magnesium-silicone using the above vacuum casting process. In other words, the panel 24 may be formed using the vacuum die casting process, thereby resulting in a component having low porosity, high elongation, and consistent properties. Additionally, wall thicknesses of the panel 24 may be controlled more tightly and be reduced for a specific required yield strength or achieve a higher strength without increasing component thickness and mass. As a result of the subject high-integrity die-casting process, in a particular application, the yield strength of the panel 24 material may be in a range of 130-160 MPa.

As shown in FIGS. 1-2, the panel 24 is reinforced with a support member 28. The support member 28 is configured to fit within the open section 26 of the panel 24 and be enveloped by two sides of the open section's C-shape. Specifically, the support member 28 includes an external form 28-1 (shown in FIG. 2) configured to interface with and match at least two of the three surfaces 26-1, 26-2, and 26-3 of the contour 24-1. The support member 28 also has a support member length L2 configured to fit within the contour length L1. In other words, the support member length L2 should be at least marginally shorter than contour length L1. The support member 28 may be an extruded component. Material of the support member 28 may be an aluminum alloy.

Alternatively, the support member 28 may be constructed from another relatively tough material, such as steel, carbon fiber, or engineered plastic. To provide appropriate reinforcement to the panel 24, the yield strength of the support member 28 material may be at least 220 MPa. Specifically, in some applications, the yield strength of the support member 28 may be in a range of 220-240 MPa. In other applications, the yield strength of the support member 28 may be in a range of 310-340. Such ability to select the strength of the support member 28 provides tune-ability of the strength of the bulkhead 22 to match the specific application and/or location of the bulkhead in the vehicle body structure 12.

Figure 5:
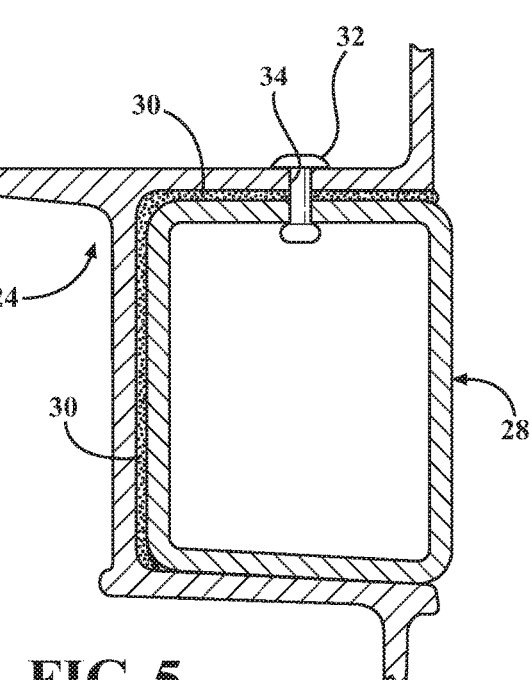
FIG. 5 is a schematic close-up perspective view of the panel reinforced with the support member, and depicting an adhesive and one embodiment of a fastener configured to fix the support member to the panel, according to the disclosure.
Figure 6:
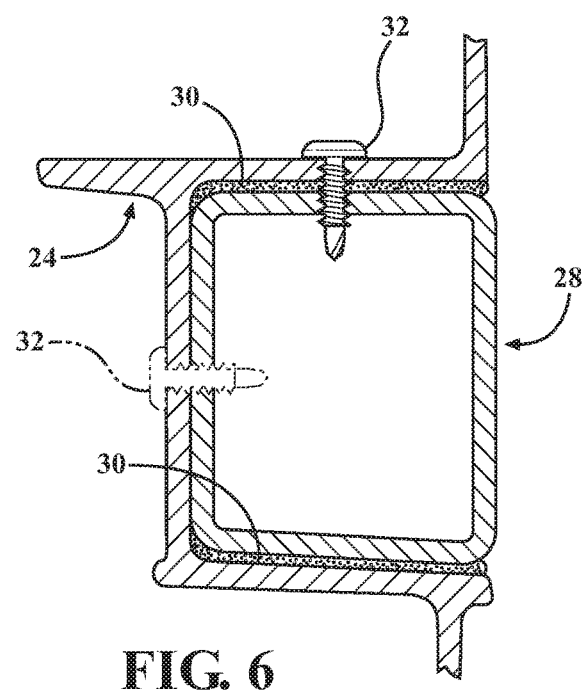
FIG. 6 is a schematic close-up perspective view of the panel reinforced with the support member, and depicting the adhesive and another embodiment of the fastener configured to fix the support member to the panel, according to the disclosure.

The support member 28 also includes a boxed cross-section 28-2 (shown in FIGS. 4-6) having a substantially uniform shape along the member length L2. As may be seen in FIGS. 4-6, the boxed cross-section 28-2 of the support member 28 may have a somewhat trapezoidal shape to account of die pull and facilitate effective fit between the panel 24 and the support member 28. The term "boxed" means that, in the cross-sectional view, the support member 28 has an enclosed hollow structure providing enhanced stiffness, especially in torsion, as compared to an open, such as an I-beam structure. The bulkhead 22 also includes an adhesive 30, such as an epoxy, applied between the external form 28-1 of the support member 28 and the at least two of the three interfacing surfaces 26-1, 26-2, and 26-3 of the contour 24-1 to thereby bond the support member to the panel and reinforce the bulkhead. As such, the adhesive 30 facilitates generation of a load transfer path between the vehicle frame rail 16A or 16B, the panel 24, and the support member 28. Use of the adhesive 30 to bond the support member 28 to the panel 24 is specifically useful in place of other binding methods, such as welding, which may introduce residual stresses and dimensional distortion into the bulkhead 22. Accordingly, use of the adhesive 30 between the support member 28 and the panel 24 is advantageous in cases where the panel spans large distances, for example greater than 50 cm, to maintain precise dimensions of the vehicle body structure 12.

The reinforced bulkhead 22 may additionally include at least one fastener 32 configured to extend through the contour 24-1 of the panel 24 and into the external form 28-1 of the support member 28. Specifically, each fastener 32 may extend through one of the three interfacing surfaces 26-1, 26-2, and 26-3 of the contour 24-1 and into the support member 28. The specific number and location of fasteners 32 used to fix the support member 28 to the panel 24 may be selected based on the support member length L2 and the number of surfaces 26-1, 26-2, and 26-3 of the contour 24-1 interfacing with the external form 28-1 of the support member 28. The fastener(s) 32 are thereby configured to supplement the adhesive 30 to fix the support member 28 to the panel 24 and generate a reinforced bulkhead 22 with enhanced structural integrity.

Each of the panels 24 and the support members 28 may define a pre-generated, such as pre-formed, pre-machined, or pre-drilled, respective part of an aperture(s) 34 configured to accept the fastener. In such an embodiment, each of the fasteners 32 may be a blind rivet (shown in FIG. 5). A blind rivet assembly includes a tubular rivet shaft and a mandrel through the center of the shaft. The blind rivet assembly embodiment of the fastener 32 is intended to be inserted into the pre-generated aperture 34 and expanded therein, following which the mandrel snaps off. Alternatively, the panel 24 and the support member 28 may be characterized by an absence of pre-generated aperture(s), such as the pre-formed, pre-machined, or pre-drilled aperture 34, for accepting the fastener(s) 32. In such an embodiment, each of the fasteners 32 may be a flow drill screw (shown in FIG. 6). A drill screw embodiment of the fastener 32 is configured to generate the fastener aperture 34 through each of the panel 24 and the support member 28 by drilling and locally melting material of the panel and support member in its path, as the screw is driven into the bulkhead 22.

Overall, the bulkheads 22, including panels 24 reinforced with respective support members 28, and fixed to the frame rails 16A, 16B, and the sub-structures 17A, 17B may be employed to generate a high-strength section of the vehicle body structure 12. Such a high-strength section may be the front section 12-1 or the rear section 12-2 of the vehicle body structure 12. The resultant vehicle body structure 12 may be used to establish a robust foundation for a passenger vehicle, such as the vehicle 10, i.e., a more effective platform for the vehicle's powertrain 18, passengers, and cargo, and provide a more precise tuning of the vehicle's steering and suspension.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A bulkhead for a vehicle body structure, the bulkhead comprising:
   a panel having a contour defined by a contour length and characterized by an open section having three surfaces in a cross-sectional view of the panel;
   a support member embedded in the panel and having:
      an external form configured to interface with and match at least two of the three surfaces of the contour;
      a support member length configured to fit within the contour length; and
      a boxed cross-section having a substantially uniform shape along the support member length; and
   an adhesive applied between the external form of the support member and the at least two of the three surfaces of the contour to thereby bond the support member to the panel and reinforce the bulkhead.

2. The bulkhead of claim 1, wherein the panel is a high-integrity die-casting formed as a vacuum is generated in a die and having consistent material properties.

3. The bulkhead of claim 2, wherein material of the panel is an aluminum alloy.

4. The bulkhead of claim 3, wherein yield strength of the material of the panel is in a range of 130-160 MPa.

5. The bulkhead of claim 1, wherein the support member is an extruded component.

6. The bulkhead of claim 5, wherein material of the support member is an aluminum alloy.

7. The bulkhead of claim 6, wherein yield strength of the material of the support member is at least 220 MPa.

8. The bulkhead of claim 1, further comprising a fastener configured to extend through the external form of the support member and one of the at least two of the three surfaces of the contour to thereby supplement the adhesive and fix the support member to the panel.

9. The bulkhead of claim 8, wherein the support member defines a pre-generated aperture configured to accept the fastener, and wherein the fastener is a blind rivet.

10. The bulkhead of claim 8, wherein the support member is characterized by an absence of a pre-generated aperture configured to accept the fastener, and wherein the fastener is a flow drill screw configured to generate a fastener aperture by locally melting material of the support member.

11. A vehicle comprising:
a vehicle frame rail;
a bulkhead fixed to the vehicle frame rail and including:
  a panel having a contour defined by a contour length, and characterized by an open section having three surfaces in a cross-sectional view of the panel;
  a support member having:
    an external form configured to interface with and match at least two of the three surfaces of the contour;
    a support member length configured to fit within the contour length; and
    a boxed cross-section having a substantially uniform shape along the support member length; and
  an adhesive applied between the external form of the support member and the at least two of the three surfaces of the contour to thereby bond the support member to the panel and reinforce the bulkhead.

12. The vehicle of claim 11, wherein the panel is a high-integrity aluminum alloy die-casting formed as a vacuum is generated in a die and having consistent material properties.

13. The vehicle of claim 12, wherein yield strength of the material of the panel is in a range of 130-160 MPa.

14. The vehicle of claim 11, wherein the support member is an extruded component.

15. The vehicle of claim 14, wherein material of the support member is an aluminum alloy.

16. The vehicle of claim 15, wherein yield strength of the material of the support member is at least 220 MPa.

17. The vehicle of claim 11, wherein the bulkhead additionally includes a fastener configured to extend through the external form of the support member and one of the at least two of the three surfaces of the contour to thereby supplement the adhesive and fix the support member to the panel.

18. The vehicle of claim 17, wherein the support member defines a pre-generated aperture configured to accept the fastener, and wherein the fastener is a blind rivet.

19. The vehicle of claim 17, wherein the support member is characterized by an absence of a pre-generated aperture configured to accept the fastener, and wherein the fastener is a flow drill screw configured to generate a fastener aperture by locally melting material of the support member.

20. A bulkhead for a vehicle body structure, the bulkhead comprising:
a panel having a contour defined by a contour length and characterized by an open section having three surfaces in a cross-sectional view of the panel;
a support member embedded in the panel and having:
  an external form configured to interface with and match at least two of the three surfaces of the contour;
  a support member length configured to fit within the contour length; and
  a boxed cross-section having a substantially uniform shape along the support member length;
an adhesive applied between the external form of the support member and the at least two of the three surfaces of the contour to thereby bond the support member to the panel and reinforce the bulkhead; and
a fastener configured to extend through the external form of the support member and one of the at least two of the three surfaces of the contour to thereby supplement the adhesive and fix the support member to the panel.

* * * * *